United States Patent
Sibley

[11] Patent Number: 5,848,592
[45] Date of Patent: Dec. 15, 1998

[54] AIR FILTER

[76] Inventor: Nels B. Sibley, 237 Avenue Q North, Saskatoon, Saskatchewan, Canada, S7L 2X5

[21] Appl. No.: 532,990

[22] Filed: Sep. 25, 1995

[51] Int. Cl.[6] .................................................. A62B 7/10
[52] U.S. Cl. .............................. 128/205.27; 128/200.11; 128/200.13; 128/204.16
[58] Field of Search ......................... 128/209.27, 205.28, 128/205.29, 204.15, 204.16, 200.11, 200.12, 200.13

[56] References Cited

U.S. PATENT DOCUMENTS

| | | | |
|---|---|---|---|
| 1,170,526 | 2/1916 | Gaither | 128/205.27 X |
| 1,196,539 | 8/1916 | Goldberg | 128/205.27 X |
| 1,948,945 | 2/1934 | Seijo | 128/200.11 |
| 2,085,155 | 6/1937 | Heidbrink | 128/205.29 X |
| 2,088,720 | 8/1937 | Poliniak | 128/200.13 |
| 3,580,430 | 5/1971 | Angele | 222/394 |
| 4,146,026 | 3/1979 | Montalvo | 128/200.13 |
| 4,304,230 | 12/1981 | Seufert | 128/206.17 |
| 4,790,307 | 12/1988 | Haber et al. | 128/206.19 |
| 5,194,664 | 3/1993 | Rhea | 222/464 |
| 5,322,060 | 6/1994 | Johnson | 128/205.27 |
| 5,394,870 | 3/1995 | Johansson | 128/205.22 |

FOREIGN PATENT DOCUMENTS

| | | |
|---|---|---|
| 1166927 | 5/1984 | Canada . |
| 1289037 | 9/1991 | Canada . |

*Primary Examiner*—John G. Weiss
*Assistant Examiner*—V. Srivastava
*Attorney, Agent, or Firm*—Murray E. Thrift; Adrian D. Battison

[57] ABSTRACT

A personal use air filter includes a water chamber through which the air is initially bubbled to remove particulates, vapors and gases and to humidify and cool the air before it is delivered to the user. In most cases additional filtering is provided downstream of the water bath using an adsorbent filter or an adsorbent filter in combination with a particulates filter. The unit may be power operated using batteries contained within the housing in a sealed battery compartment.

19 Claims, 4 Drawing Sheets

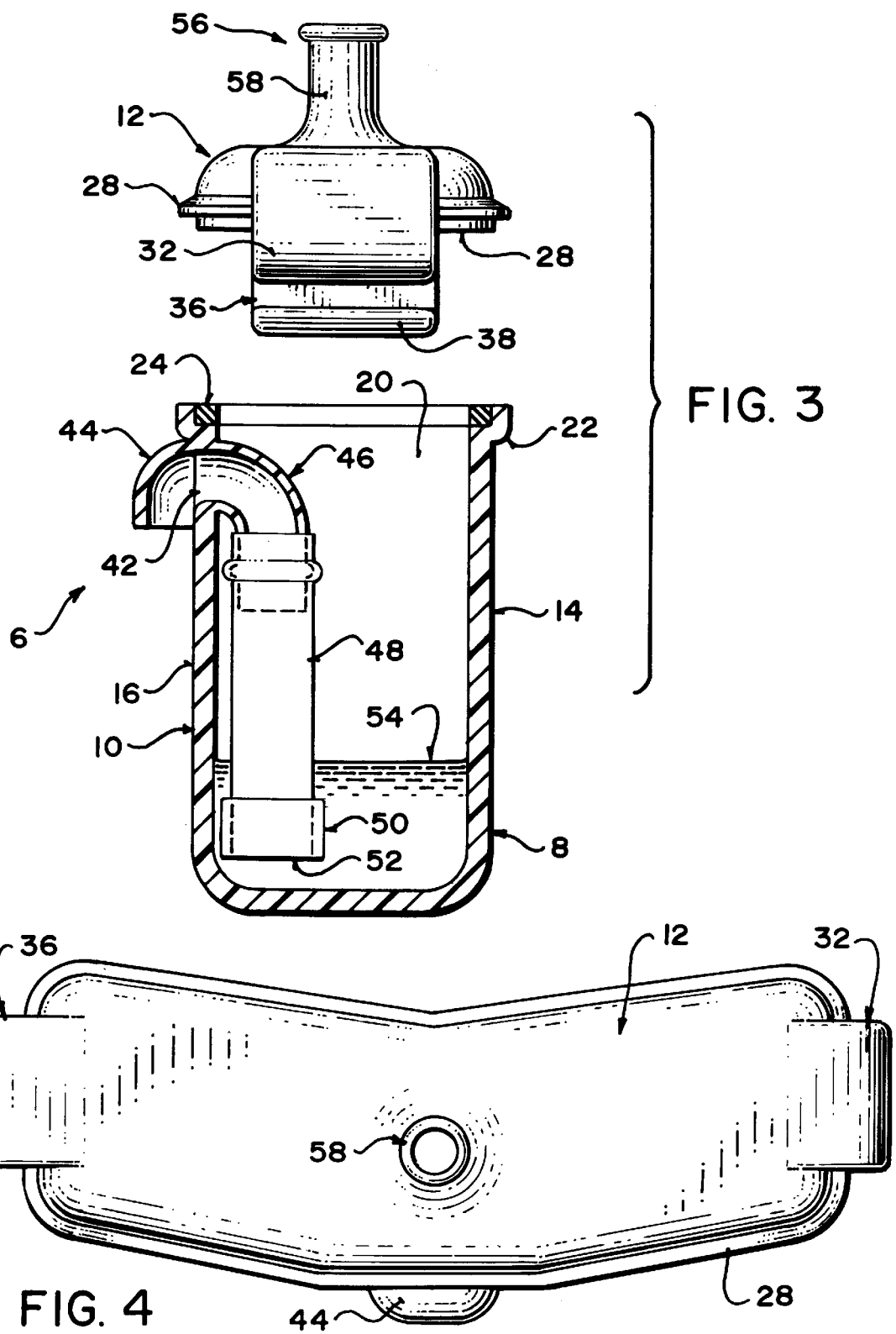

AIR FILTER

FIELD OF THE INVENTION

The present invention relates to an air filter for personal use.

BACKGROUND

Respiration can be a problem in the workplace and in other environments. Air may be contaminated by particulates, vapors and gases. Various products have been used, particularly in the workplace, for removing those contaminants from the air being breathed. These include dust masks, passive respirators, positive pressure respirators and self-contained breathing apparatus.

The dust mask is the least expensive product for dealing with air contamination. Dust masks do not remove contaminant gases or vapors and will quickly plug in a dusty environment. When a mask becomes plugged, there is significant heat and moisture buildup inside the mask and the user must work harder than normal to breathe. This makes the product uncomfortable to use and requires frequent replacement of the filter. Where the life of the filter is relatively short, these products are not cost effective.

Passive respirator systems generally have silicon rubber masks and two-stage filter systems. The filtering systems include a cloth or paper particulates filter and an adsorbent filter, for example of activated carbon, cupric oxide, etc. A third filter element may also be used. These products, like the dust masks, are hot and will plug quickly in dusty conditions. Respirators of this type generally do not fit under welding helmets, further limiting their usefulness in the workplace.

Positive pressure respirators are generally used where oxygen concentration is low, harmful gases or vapors are present or the air quality is quite poor. These systems are costly, and in most cases unnecessary since appropriate ventilation can be provided. It is often necessary to have an attendant monitoring the air bottles in such a system to ensure proper operation.

A self-contained breathing apparatus is quite heavy, in the order of 40–60 pounds. This type of apparatus requires frequent servicing at high cost.

The present invention aims at the provision of an improved filter system.

SUMMARY

According to the present invention there is provided a personal use air filter comprising:
 a housing;
 an air inlet into the housing;
 an air outlet from the housing;
 a water chamber in the housing containing a body of water and air above the water;
 inlet air duct means leading from the air inlet into the water chamber for ducting air from the inlet into the body of water; and
 air passage means leading from the chamber above the body of water to the air outlet.

Bubbling the air through the water removes many particulates, vapors and water soluble gases from the air. This extends the life of any downstream filter or filters, resulting in less frequent filter replacement and thus reduced overall costs. The water is cooled by evaporation as air is bubbled through it. The air is in turn humidified and cooled.

The filter unit can be equipped with a particulates filter. This may be wetted by the body of water in the filter. It may also include an adsorbent material filter for removing vapors and gases that pass through the water bath.

For severe conditions, a small, battery powered blower can be added to the filter to provide a forced air flow.

The inlet air duct may be configured as a pendulum, so that its bottom end remains immersed in the body of water regardless of the orientation of the housing.

Surfactants and other chemical agents may be added to the water bath to promote the dissolution of contaminants as air is bubbled through the water.

BRIEF DESCRIPTION OF THE DRAWINGS

In the accompanying drawings, which illustrate exemplary embodiments of the present invention:

FIG. 3 is a section along line 3—3 of FIG. 2;

FIG. 4 is a top view of the filter; and

DETAILED DESCRIPTION

Figure 1:
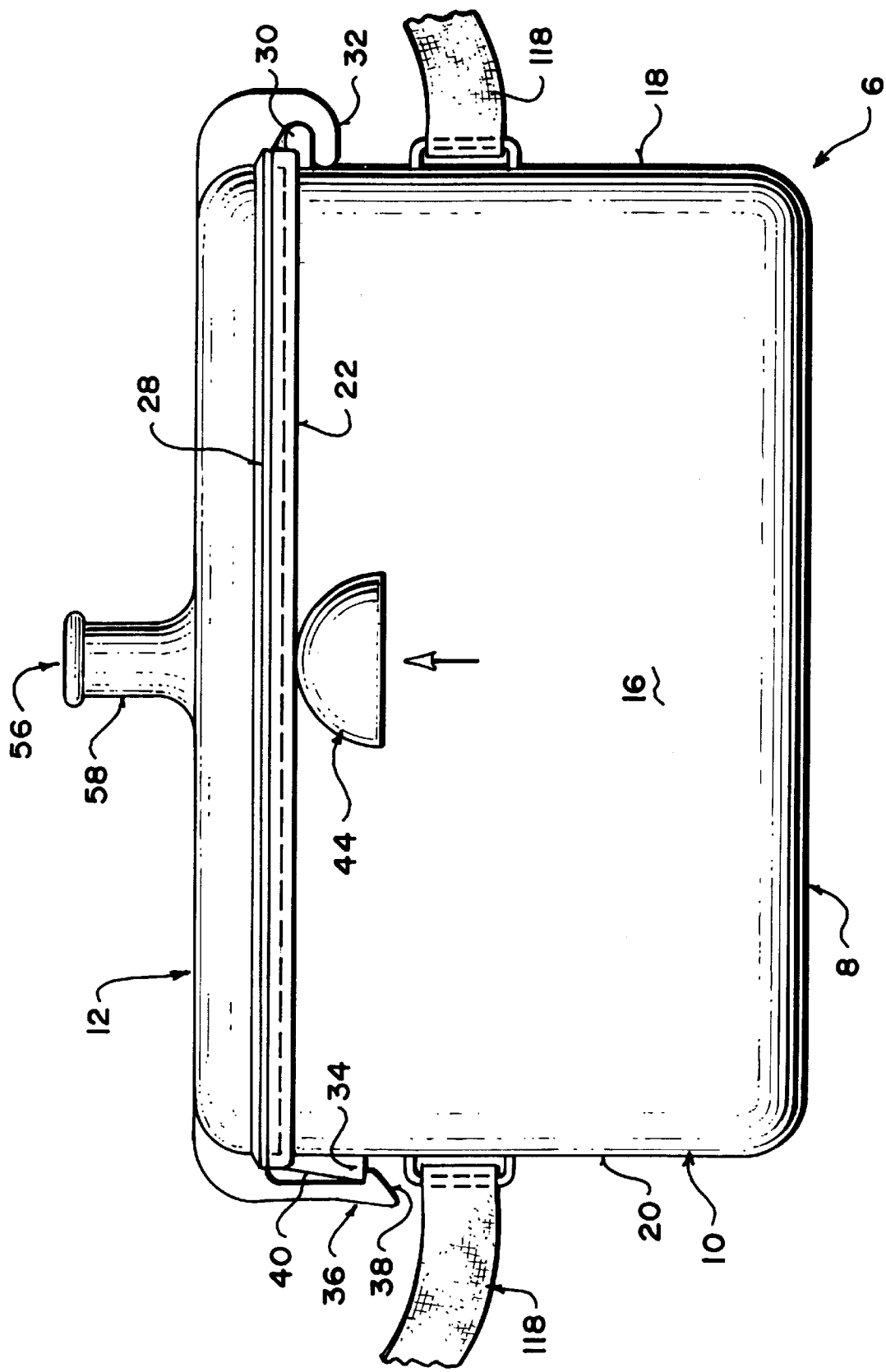
FIG. 1 is a front view of a filter according to the present invention.
Figure 2:
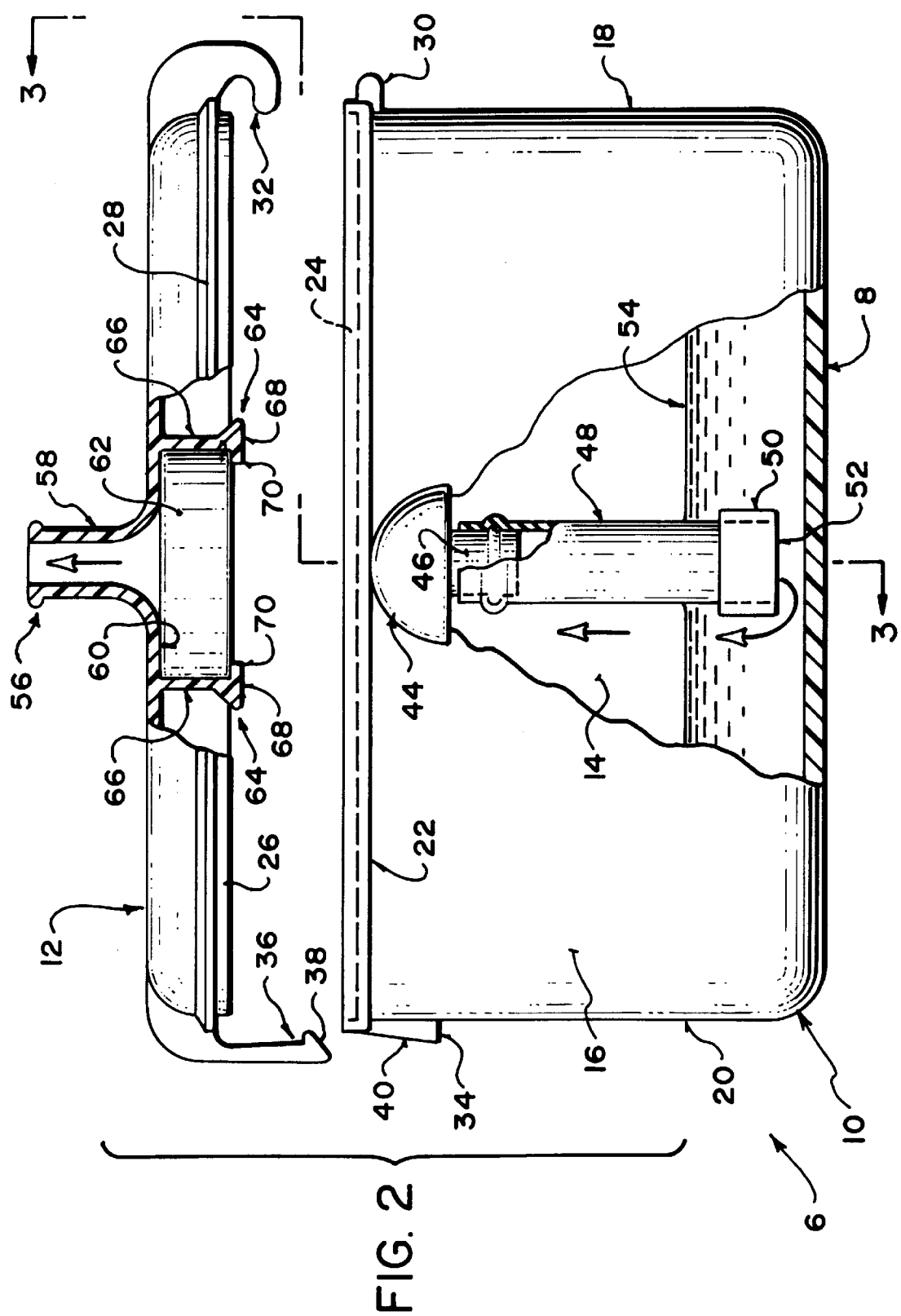
FIG. 2 is a view like FIG. 1, partially in cross-section and with the parts shown disassembled.

Referring to the accompanying drawings, and especially to FIGS. 1 through 4, there is illustrated a filter 6 having a housing 8 with a base part 10 and a cap 12. The housing base has a back panel 14 with a shallow V-shape and a matching, slightly convex front side 16 and two ends 18 and 20. At the open top end of the base is an outwardly offset rib 22 surrounding a gasket 24. The gasket seals against the bottom peripheral edge 26 of the cap 12. Surrounding the cap is a flange 28 that engages the top of the rib 22. A lug 30 at end 18 of the base engages in a rounded hook 32 on the end of the cap 12 to provide a pivoting action. At the opposite end 20 of the housing is a shoulder 34 that is engaged by a snap hook 36 on the opposite end of the cap when the cam face 38 of the hook is cammed over the sloping face 40 of the shoulder to snap into place under the shoulder to hold the cap in place.

The base has an air inlet 42 in the front side 16. The outer side of this inlet opening is covered with a shroud 44 that limits the direct ingress of large quantities of dust and the like. On the inside of the air inlet 42 is an elbow 46 that turns from the horizontal to a vertical, downwardly projecting orientation. The elbow leads to a surgical rubber tube 48 which in turn extends to a position close to the bottom of the base 10. A stainless steel counterweight 50 is mounted on the bottom of the rubber tube so that the tube will swing as a pendulum inside the housing, with the bottom end 52 always immersed in a body of water 54 inside the housing.

At the center of the cap 12 is an air outlet 56. This includes a spigot 58 that will connect to the hose of a respirator mask. In the underside of the cap, below the spigot, is a recess 60 that receives a canister 62 housing an adsorbent filter. The canister is held in place using two retainers 64. Each has a resilient arm 66 depending from the top of the cap and a head 68 on the bottom of the arm with a lip 70 that extends under the canister. To release the canister for replacement, the heads 68 are deflected outwardly to the sides, freeing the canister for removal and replacement.

In use of this filter, air is drawn from the air outlet 56 by the user, normally through a hose and mask. This air has been drawn through the inlet 42 and the tube 48 to bubble through the body of water 54 in the housing. The water performs an initial filtering action, removing many of the particulates in the water and absorbing vapors and soluble gases. The water may include surfactants and other agents to augment this action. The air, thus cleansed, passes through the filter canister to the mask of the user. This provides a clean, humidified, cool air flow.

Figure 5:
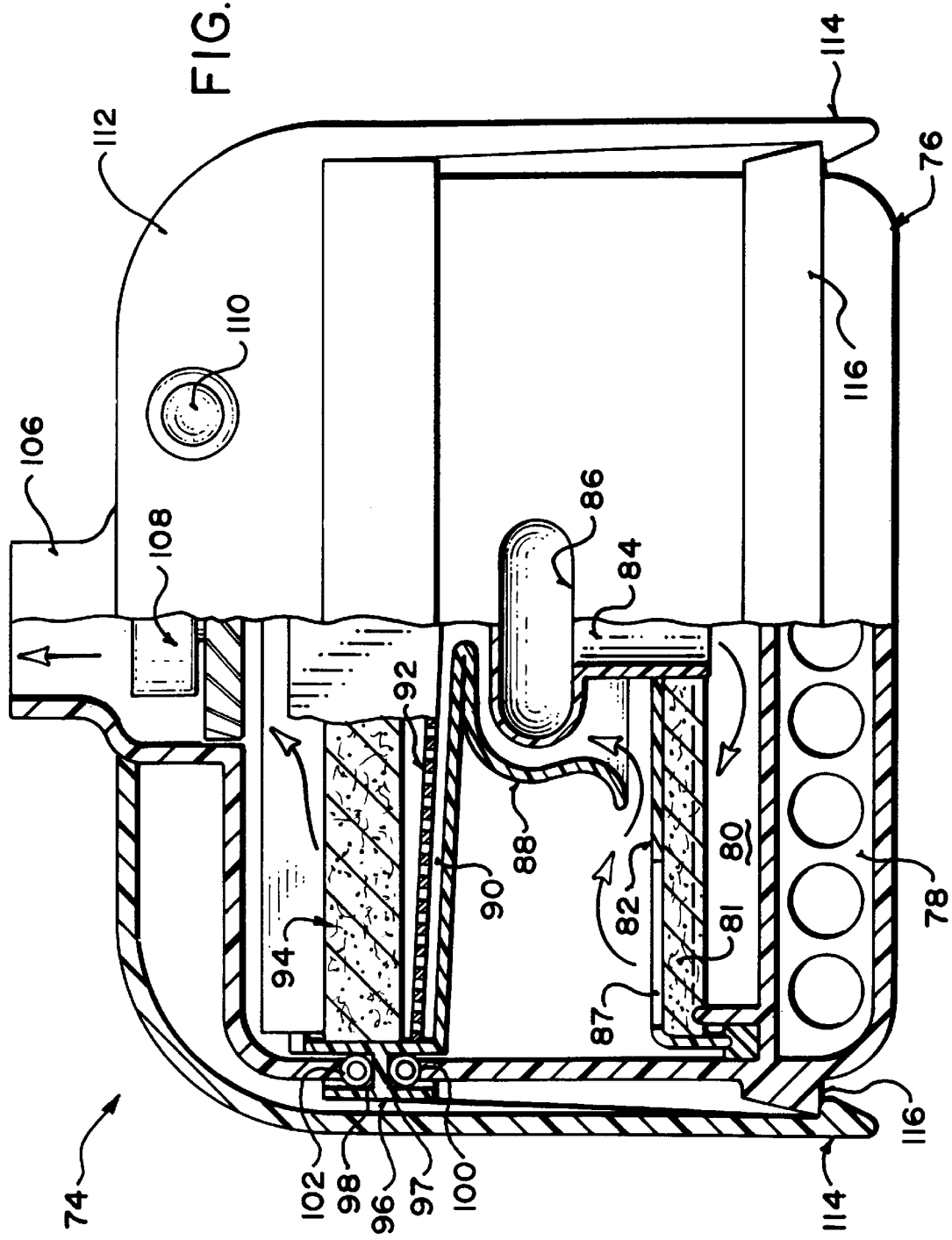
FIG. 5 is a front view, partially in section of an alternative embodiment of the filter.

An alternative embodiment of the filter is illustrated in FIG. 5. The filter 74 has a housing 76 similar in overall shape to the housing 12. In the bottom of the housing 76 is a battery chamber 78 housing electric storage batteries. This is sealed from a water chamber 80 immediately above the battery chamber. The water chamber is covered with a layer of filter material 81, held in place with a cover 82. An inlet air duct 84 penetrates the cover, with the open bottom end of the duct immersed in the body of water in the water chamber. The duct 84 is connected to an air inlet 86 that extends transversely from the duct through the front wall of the housing 76. Air drawn through the air duct into the body of water escapes from the water chamber 80 through openings 87 in the cover of the water chamber, near its ends. Two baffles 88 are positioned on opposite sides of the inlet 86 so that air leaving the water chamber will be directed through a center opening above the inlet 86 into the bottom of a filter canister 90. The filter canister includes a particulates filter 92 and an adsorbent filter 94. The canister has a peripheral mounting ring 96 with peripheral recesses 97 and 98 for receiving seals 100 and 102 respectively. The seal 100 is mounted on the upper edge of the housing base 103, while the seal 102 is secured to the lower edge of a housing cap 104. The cap has an air outlet 106 communicating with the upper end of the filter canister 90. A fan 108 is mounted in the air outlet to produce a positive draw of air through the canister. The fan is operated by the batteries in the battery chamber under the control of a switch 110. The housing parts are held together with snap-on cover 112 with a central opening engaging over the outlet 106 and two hooks 114 engaging at opposite ends of the housing under a rib 116 extending peripherally around the housing base.

This second embodiment of the filter does not use a pendulum air inlet. Instead the water is confined. The fan driven air flow overcomes resistance to air flow through the filter.

The filter is intended to be worn on the body of a user. To this end, it may be fitted with a belt 118 (FIG. 1) or some other harness for mounting the canister in a convenient place on the wearer's body.

While certain embodiments of the present invention have been described in the foregoing, it is to be understood that other embodiments are possible within the scope of the invention. The invention is to be considered limited solely by the scope of the appended claims.

I claim:

1. A personal use air filter comprising:

a housing;

a single water chamber in the housing containing a body of water, a gas adsorbent substance dissolved in the water, and air above the water;

an air inlet into the housing, opening into said water chamber above the body of water;

inlet air duct means comprising a flexible tube having an upper end secured to the air inlet, a lower end extending into the body of water for ducting air from the inlet into the body of water and a weight on a lower end of the flexible tube;

an air outlet from the housing, opening directly into said water chamber above the body of water; and filter means comprising a bed of filtering material extending across the air outlet for filtering air passing through the air outlet.

2. A filter according to claim 1 wherein the filter means comprise a bed of adsorbent material.

3. A filter according to claim 2, wherein the filter means further comprise a particulates filter for filtering particulate material from air passing therethrough.

4. A filter according to claim 1 including air blower means for forcing air through the filter.

5. A filter according to claim 4 wherein the air blower is in the air outlet.

6. A filter according to claim 4 including battery means for operating the air blower.

7. A filter according to claim 1 including means for attaching the filter to a user's body.

8. A filter according to claim 1 wherein the housing has a base portion with an open top and a removable cover.

9. A filter according to claim 8 wherein the air inlet comprises an opening in a side wall of the base portion of the housing.

10. A filter according to claim 8 wherein the air outlet comprises an opening in the cover of the housing.

11. A filter according to claim 10 including a recess in the cover, around the outlet opening and wherein the filter means comprise a filter canister in the recess.

12. A personal use air filter comprising:

a housing;

a single water chamber in the housing containing a body of water, a surfactant dissolved in the water, and air above the water;

an air inlet into the housing, opening into said water chamber above the body of water;

inlet air duct means comprising a flexible tube having an upper end secured to the air inlet, a lower end extending into the body of water for ducting air from the inlet into the body of water and a weight on a lower end of the flexible tube;

an air outlet from the housing, opening directly into said water chamber above the body of water; and filter means comprising a bed of filtering material extending across the air outlet for filtering air passing through the air outlet.

13. A filter according to claim 12 wherein the filter means comprise a bed of adsorbent material.

14. A filter according to claim 12 including air blower means for forcing air through the filter.

15. A filter according to claim 13 wherein the filter means further comprise a particulates filter for filtering particulate material from air passing therethrough.

16. A filter according to claim 12 including air blower means for forcing air through the filter.

17. A filter according to claim 16 wherein the air blower is in the air outlet.

18. A filter according to claim 17 including battery means for operating the air blower.

19. A filter according to claim 12 including means for attaching the filter to a user's body.

* * * * *